United States Patent

Noda et al.

[11] Patent Number: 5,796,685
[45] Date of Patent: Aug. 18, 1998

[54] DIGITAL SERVO CIRCUIT GENERATING MIRROR DETECTING SIGNAL

[76] Inventors: Hidenobu Noda; Yasuyuki Suda, both c/o Sony LSI Design Corporation, 134 Koudo-Cho, Hodogaya-Ku Yokohama-Shi, Kanagawa, Japan

[21] Appl. No.: 631,965

[22] Filed: Apr. 15, 1996

[30] Foreign Application Priority Data

Apr. 28, 1995 [JP] Japan ................................. 7-106681

[51] Int. Cl.$^6$ ........................................ G11B 7/095
[52] U.S. Cl. ............................... 369/44.28; 369/54
[58] Field of Search ............................ 369/32, 44.25, 369/44.28, 44.34, 54

[56] References Cited

U.S. PATENT DOCUMENTS

| | | |
|---|---|---|
| 4,835,756 | 5/1989 | Kaku et al. . |
| 5,073,885 | 12/1991 | Ito et al. ............................ 369/44.28 |
| 5,239,530 | 8/1993 | Seo et al. ............................ 369/54 |

FOREIGN PATENT DOCUMENTS

| | | |
|---|---|---|
| 479 473 | 4/1992 | European Pat. Off. . |
| 480 761 | 4/1992 | European Pat. Off. . |
| 539 959 | 5/1993 | European Pat. Off. . |

*Primary Examiner*—W. R. Young
*Attorney, Agent, or Firm*—Ronald P. Kananen

[57] ABSTRACT

A digital servo circuit generating a digital RF signal in accordance with the intensity of a reflected light of light irradiated to a surface of a recording medium by an optical pickup and generating a mirror-surface detection signal based on a peak level and bottom level of the digital RF signal. The circuit includes a peak level counter which performs a comparison between the potential of the digital RF signal and a first potential held in advance and, when the potential of the digital RF signal is larger than the first potential, holds the potential of the digital RF signal as the first potential and, when otherwise, performs a down count at a speed in accordance with an enable signal; a bottom level counter which performs a comparison between the potential of the digital RF signal and a second potential held in advance and, when the potential of the digital RF signal is larger than the second potential, holds the potential of the digital RF signal as the second potential and, when otherwise, performs an up count at a speed in accordance with an enable signal; and a count speed selection circuit which selects the speed of the count in accordance with the speed of movement of the irradiated spot of light irradiated to the surface of the recording medium and supplies the same as the enable signal to the bottom level counter or the peak level counter.

8 Claims, 7 Drawing Sheets

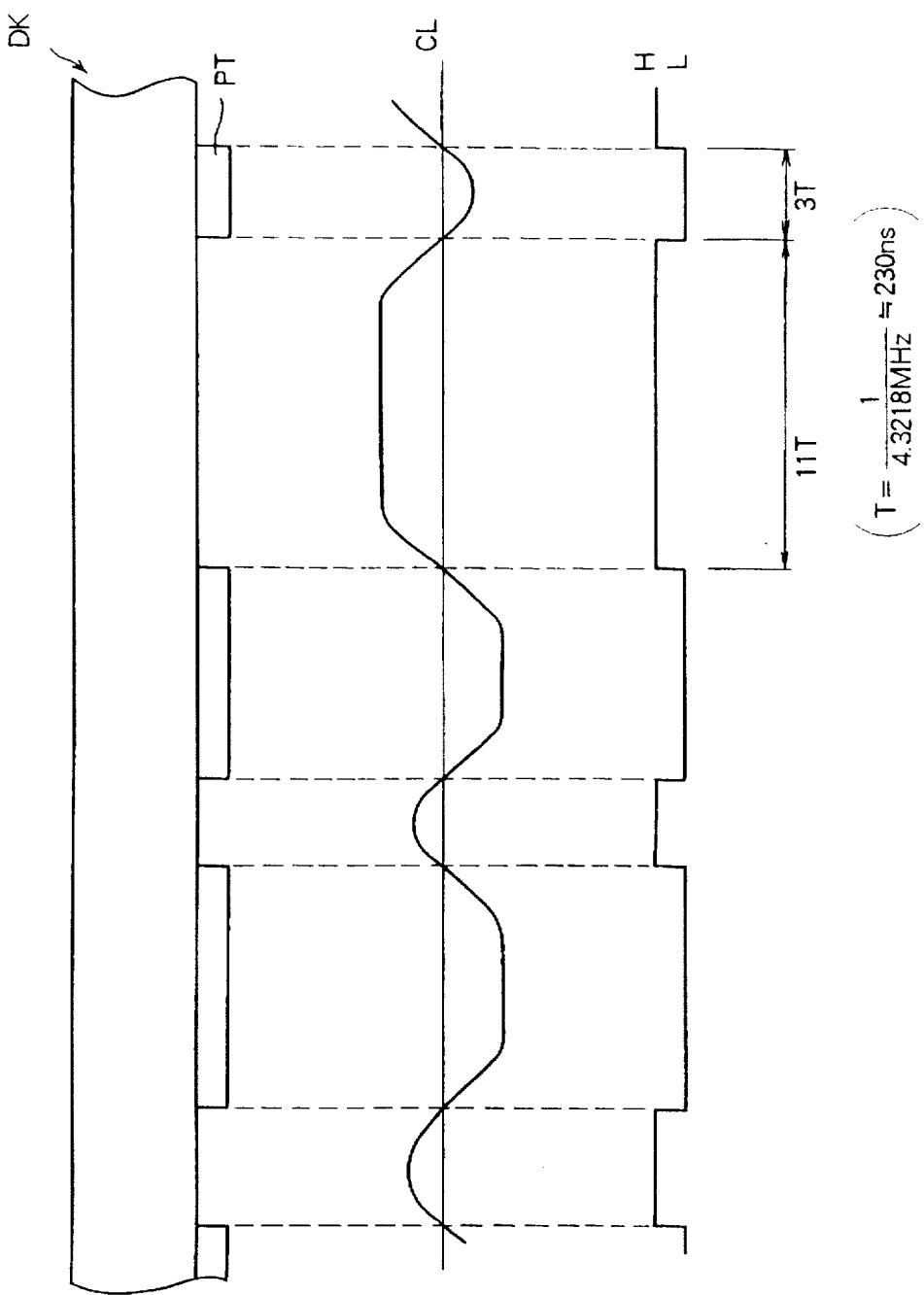

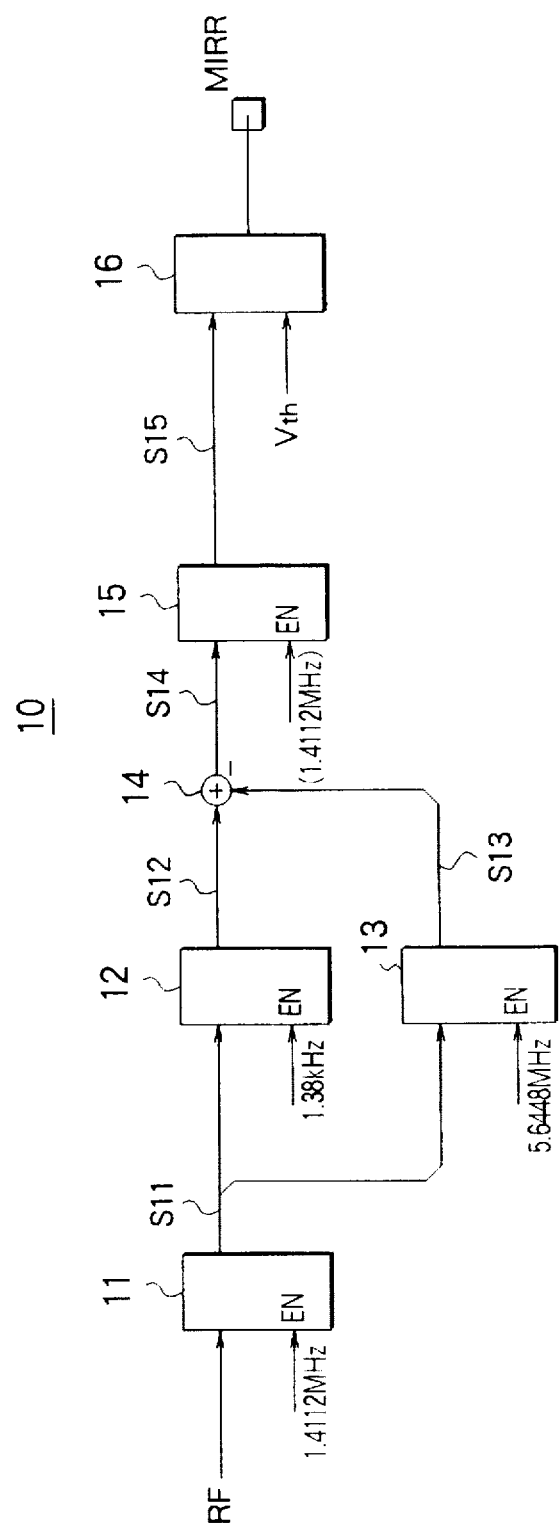

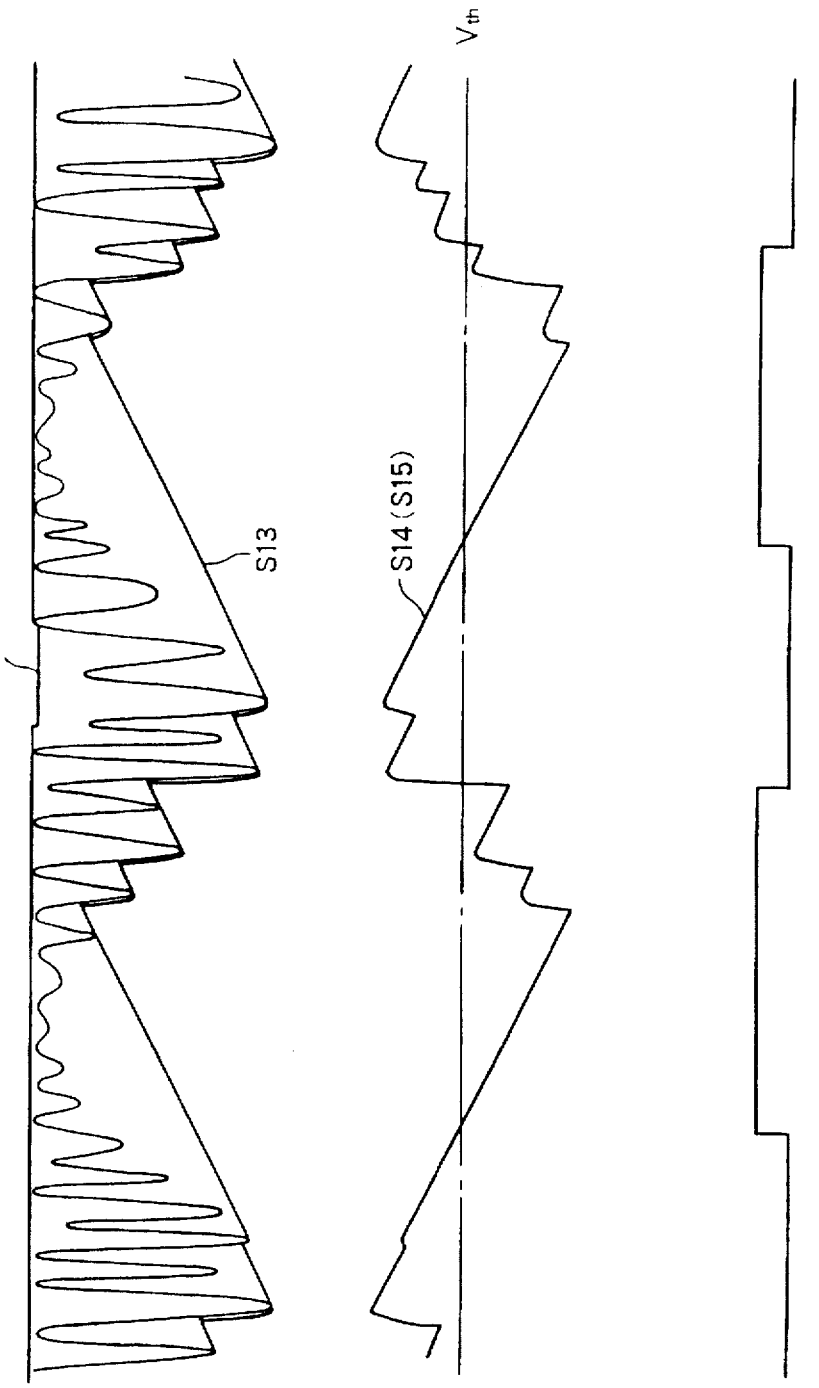

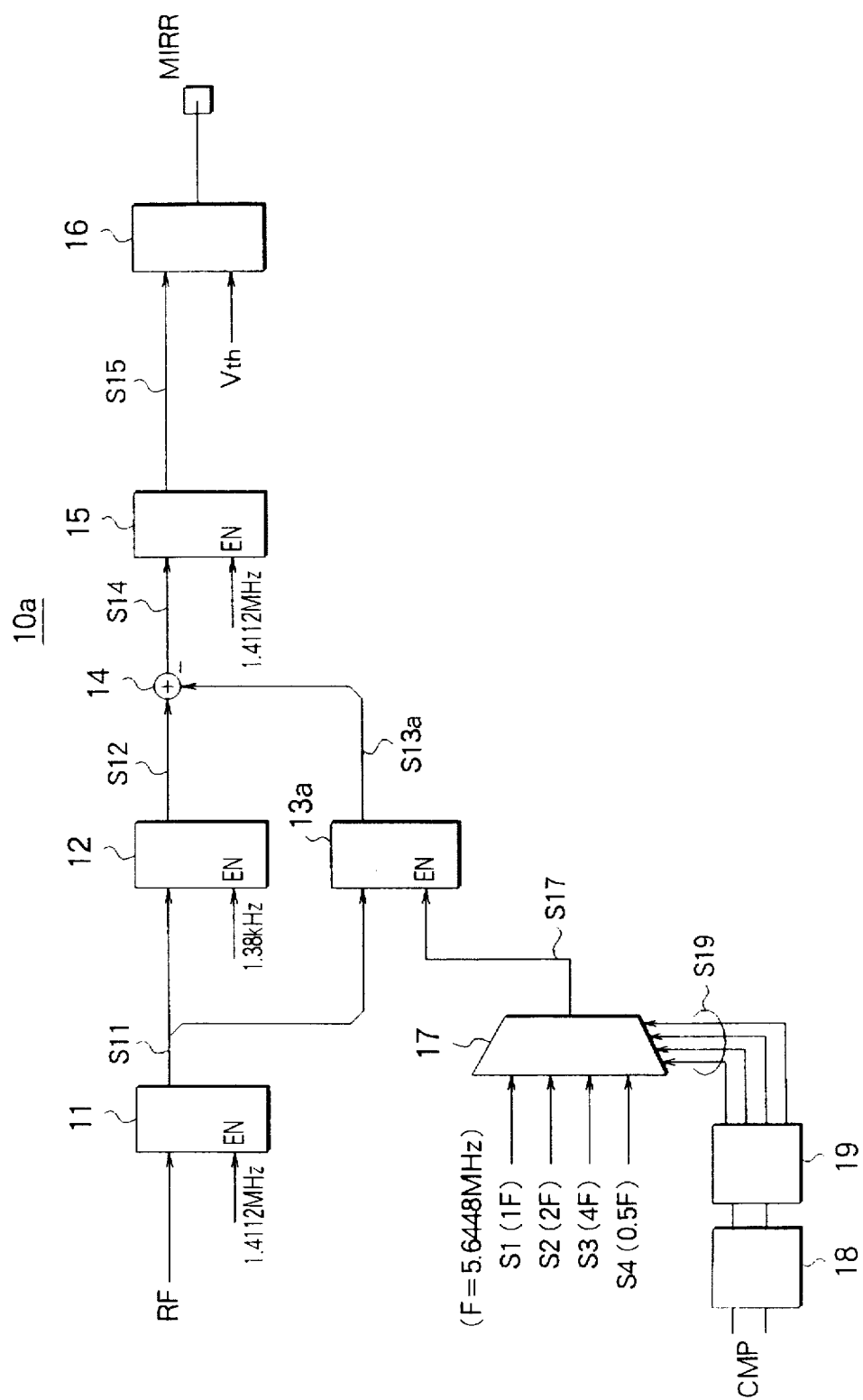

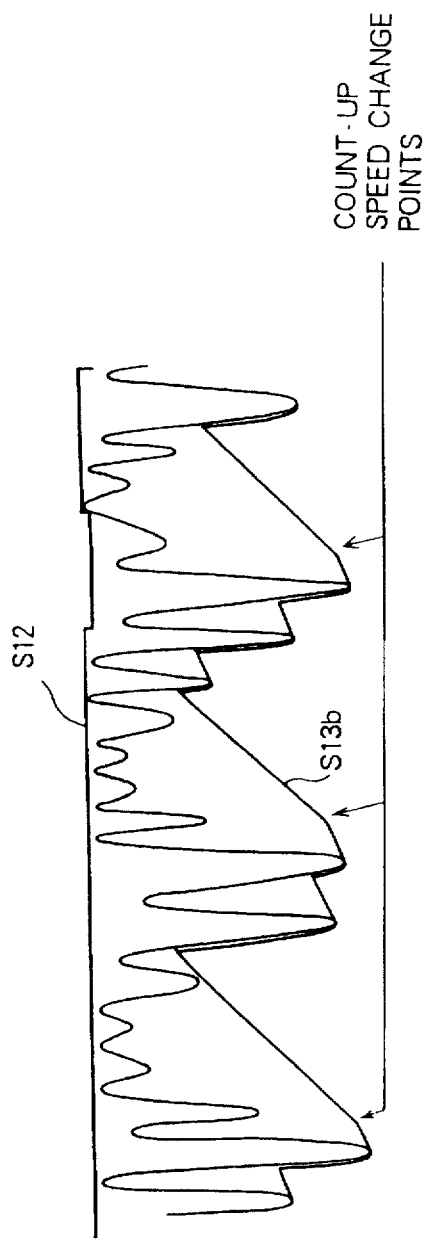
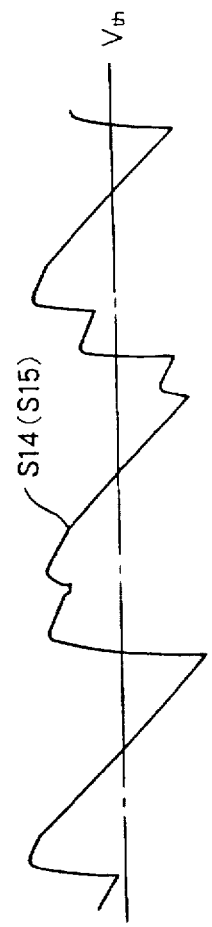
FIG. 7A
FIG. 7B
FIG. 7C

DIGITAL SERVO CIRCUIT GENERATING MIRROR DETECTING SIGNAL

BACKGROUND OF THE INVENTION

1. Field of the Invention

The present invention relates to a digital servo circuit suitable for use in an optical disc device such as a CD player.

2. Description of the Related Art

In an optical disc player, a so-called RF signal is generated based on the reflected light of light irradiated to the disc surface.

This RF signal is a signal generated by converting the intensity of the reflected light of the light irradiated to the disc surface into a voltage via a light receiving element such as a photodetector.

The RF signal becomes a high level when the light is irradiated to a portion which is not a pit since most of the light is reflected.

In an optical disc player, at the time of a reproduction operation, by converting the level of this RF signal to two values of a high level (H)/low level (L), data recorded on the disc is demodulated as digital data and, at the same time, at the time of a traverse operation, a mirror-surface detection signal (hereinafter, referred to as an MIRR signal) is generated based on the RF signal which shows the difference of the reflected light between when the light passes through a track comprised of a series of pits and when the light passes through the mirror surface.

SUMMARY OF THE INVENTION

The present invention was made in consideration with such circumstances and has as an object thereof to provide a digital servo circuit which can generate a stable MIRR signal in a wide band.

The present invention provides a digital servo circuit generating a digital RF signal in accordance with the intensity of a reflected light of light irradiated to a surface of a recording medium by an optical pickup and generating a mirror-surface detection signal based on a peak level and bottom level of the digital RF signal, provided with a peak level counter which performs a comparison between the potential of the digital RF signal and a first potential held in advance and, when the potential of the digital RF signal is larger than the first potential, holds the potential of the digital RF signal as the first potential and, when otherwise, performs a down count at a speed in accordance with an enable signal; a bottom level counter which performs a comparison between the potential of the digital RF signal and a second potential held in advance and, when the potential of the digital RF signal is larger than the second potential, holds the potential of the digital RF signal as the second potential and, when otherwise, performs an up count at a speed in accordance with an enable signal; and a count speed selection circuit which selects the speed of the count in accordance with the speed of movement of the irradiated spot of light irradiated to the surface of the recording medium and supplies the same as the enable signal to the bottom level counter.

Preferably, the count speed selection circuit selects one signal from among a plurality of count speed signals in accordance with an instruction of an external signal and that selected signal is used as the enable signal.

Preferably, the count speed selection circuit has a comparison circuit which compares the count value of the bottom level counter and the RF signal value and a selection circuit which selects one signal from among a plurality of count speed signals in accordance with the result of comparison of the comparison circuit and outputs the selected signal as the enable signal.

Preferably, the digital servo circuit further has a differential signal generating circuit for generating a differential signal of the peak hold counter and said bottom hold counter and a waveform shaping means for shaping the waveform of the differential signal by a comparison with a reference voltage and the output of the waveform shaping means is used as the mirror-surface detection signal of the medium.

According to the digital servo circuit of the present invention, for example, the speed of the bottom level counter is switched by the count speed selection circuit according to the instruction of the microprocessor in accordance with the set circumstances.

For example, an operation of setting the speed slow during the normal play operation, setting this fast in the traverse state, and setting the speed higher at the time of a further higher speed of traverse, etc. is carried out. By this, stable generation of the MIRR signal becomes possible in a wide band.

Further, according to the digital servo circuit of the present invention, one signal is selected as an enable signal from among a plurality of count speed signals by the selection circuit in accordance with the result of comparison of the count value of the bottom level counter and the RF signal value compared at the comparison circuit.

Specifically, for example, based on the rate of change of the value of the RF signal, the optimum bottom counter speed is set inside the servo circuit. By this, a count up speed in accordance with the speed of rise of the bottom level can be obtained.

Further, when the digital servo circuit operates with a negative logic, the relationship between the bottom counter and the peak counter become reversed and the speed of count of the peak counter is controlled adaptively.

BRIEF DESCRIPTION OF THE DRAWINGS

The above and other object and features of the present invention will be clear from the following description with reference to the accompanying drawings, in which:

FIGS. 1A to 1C are views of a compact disc, an RF signal generated in the case of normal speed reproduction in a CD player and a signal obtained by shaping its waveform;

FIG. 2 is a block diagram of an example of the configuration of the digital servo circuit of an optical disc player;

FIGS. 3A to 3C are views of waveforms of an RF signal and MIRR signal at the time of a traverse according to the circuit of FIG. 2;

FIG. 5 is a block diagram of a first embodiment of a digital servo circuit of an optical disc player according to the present invention;

FIGS. 7A to 7C are views of waveforms of an RF signal and MIRR signal at the time of a traverse according to the circuit of FIG. 6.

DESCRIPTION OF THE PREFERRED EMBODIMENTS

Figures 4A, 4B, 4C:
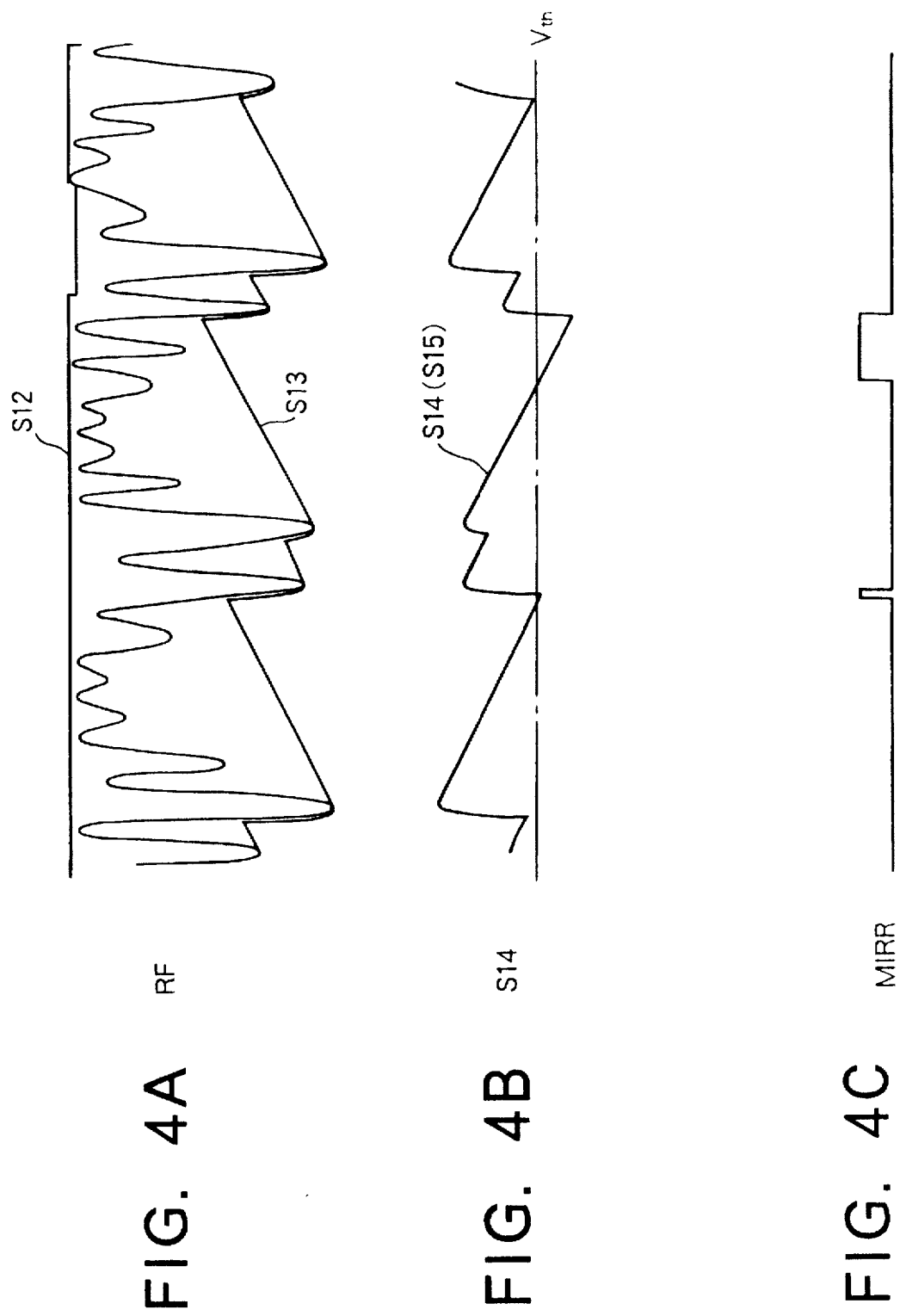
FIGS. 4A to 4C are views of waveforms for explaining the problem of FIG. 2.

Before describing the preferred embodiments, the related art will be explained in further detail with reference to the drawings for facilitating the understanding of the preferred embodiments.

FIGS. 1A to 1C are views of a compact disc (CD), a RF signal generated in the case of normal speed reproduction in a CD player and a signal obtained by shaping its waveform. The RF signal generated at the time of normal reproduction draws a waveform as shown in FIG. 1B according to the presence/absence of a pit PT recorded along the track of the disc (DK) surface as shown in FIG. 1A.

The reproduction circuit processes the RF signal shown in FIG. 1B using a waveform shaping means setting a threshold value based on its center level (CL) to obtain the shaped waveform shown in FIG. 1C.

In the case of normal speed reproduction, if the reproduction can be normally carried out, the length of the period of H/L is decided as 3T to 11T by the CD specification when T is the period of the reproduction clock.

On the other hand, the digital servo circuit also applies analog/digital (A/D) conversion to this RF signal and generates the MIRR signal.

The MIRR signal is a signal detecting that the light is irradiated to a portion not comprised of a series of pits on the disc surface, that is, the mirror surface, and inherently is not detected during a continuous reproduction operation.

Contrary to this, when the light moves across tracks, i.e., anything from jumping one track to making a large traverse moving between the inner and outer circumferences of the disc at one time, and at the time of a settlement operation immediately thereafter, generation of more concrete signal is desired.

FIG. 2 is a block diagram of an example of the configuration of a digital servo circuit.

As shown in FIG. 2, the digital servo circuit 10 is constituted by an RF register 11 for holding the RF signal subjected to A/D conversion, a peak hold counter 12, a bottom hold counter 13, an adder 14, a differential register 15, and a comparator 16.

In this way, the digital servo circuit 10 is provided with the peak hold counter 12 and the bottom hold counter 13 so as to generate an MIRR signal by using the A/D-converted RF signal.

The peak hold counter 12 performs a comparison between a value V12 held by the peak hold counter per se and the RF signal value S11 subjected to the A/D conversion at every sampling of the RF signal, fetches the value of the RF signal value S11 when it is larger, and performs a down count at a certain speed in a case other than this.

The bottom hold counter 13 performs a comparison between a value V13 held by the bottom hold counter per se and the RF signal value S11 subjected to the A/D conversion at every sampling of the RF signal, fetches the value of the RF signal value S11 when it is smaller, and performs an up count at a certain speed in a case other than this.

If the speed of the down count of the peak hold counter 12 and the speed of the up count of the bottom hold counter 13 are set to adequate speeds by using the above algorithm, generation of the MIRR signal becomes possible.

In the circuit of FIG. 2, for example, in the case of a CD player, the RF signal during the traverse operation becomes as shown in FIG. 3A, so if the speed of the down count of the peak hold counter 12 is set relatively slow and the speed of the up count of the bottom hold counter 13 is set relatively high, a peak hold counter signal waveform S12 and a bottom hold counter signal waveform S13 as shown in FIG. 3A are obtained.

Next, at the adder 14, by taking a difference between the output signal (waveform) S12 of the peak hold counter 12 and the output signal (waveform) S13 of the bottom hold counter 13, a waveform S14 as shown in FIG. 3B is obtained and is held in the differential register 15.

Then, at the comparator 16, this signal S15 of this difference and the threshold value Vth (not restricted to a fixed value) are compared. When the differential signal S15 is lower than the threshold value Vth, the MIRR signal is brought to the high level H, whereby a MIRR signal as shown in FIG. 3C of FIG. 3 can be generated.

In recent years, particularly in a CD ROM etc., a higher speed traverse is now being demanded so as to realize quick access.

At this time, to enable the microcomputer on the set to correctly recognize the number of tracks passed, it becomes necessary to correctly generate the MIRR signal tracking even a high speed traverse.

If the count up speed of the bottom hold counter 13 is fixed, however, as the traverse speed becomes faster, tracking becomes difficult and, as shown in FIG. 4C, the MIRR signal no longer can be correctly generated.

So as to cope with this, it can be considered to design the system so that the count up speed of the bottom hold counter 13 becomes faster, but if it is too fast, noise is generated at the time of a low speed traverse and, in an extreme case, the MIRR signal is generated also during the reproduction operation as shown in FIG. 1C.

As mentioned above, in the digital servo circuit 10 of the optical disc player shown in FIG. 2, when generating the MIRR signal, two counters 12 and 13 which trace the peak level and the bottom level of the RF signal, respectively, are used, but the frequency of the MIRR signal which can be generated is restricted by the tracking speed of the counter 13 on the bottom side.

When the speed of the counter on the bottom side is slow, the MIRR signal cannot track to the correct frequency at the time of a high speed traverse. Also, conversely, when the speed of the bottom counter 13 is too fast, the amplitude of the RF signal will be tracked even in a normal play state and the MIRR signal will be generated at a portion originally not aimed at.

When the speed of the bottom counter 13 is fixed, the speed of the bottom counter 13 is designed while taking note of the above two points, but in the end one or both of the trackability of a high speed traverse or the prevention of erroneous detection of the MIRR signal will be sacrificed to a certain extent.

Next, preferred embodiments of the present invention will be explained.

FIRST EMBODIMENT

FIG. 5 is a block diagram of a first embodiment of a digital servo circuit of an optical disc player according to the present invention, in which the same constituent parts as those of FIG. 2 are represented by the same references.

Namely, the digital servo circuit 10a is constituted by an RF register 11 for holding an RF signal subjected to A/D conversion, a peak hold counter 12, a bottom hold counter 13a, an adder 14, a differential register 15, a comparator 16, a selector 17, a command register, and a command decoder 18.

In accordance with the output signal S19 of the command decoder 19 and in the not illustrated microprocessor, the selector 17 selects one signal among four count speed signals S1 to S4 of 1-fold (1F), 2-fold (2F), 4-fold (4F), and 0.5-fold (0.5F) the frequency F=5.6448 MHz set in accordance with the speed at which the predicted light beam (optical head) traverses the track of the disc, for example, the traverse speed or the set state, and outputs the same as an enable signal S17 to an enable terminal EN of the bottom hold counter 13a.

By this, the bottom hold counter 13a changes the count up speed in accordance with the frequency of the enable signal S17 input to the enable terminal EN and performs a count operation in accordance with for example the traverse speed or the set state.

The command register 18 holds a command CMD indicating the signal which should be selected by the selector 17 output from the not illustrated microprocessor and outputs the same to the command decoder 19.

The command decoder 19 decodes the command CMD and outputs the selection indication signal S19 to the selector 17.

Note that, the not illustrated microprocessor generating the command CMD generates the command CMD indicating that for example the selector 17 select the signal S1 or S4 so as to set the count speed of the bottom hold counter 13a slow during for example the normal play operation.

Also, in the traverse state, it generates the command CMD indicating that for example the selector 17 select the signal S2 so as to set the count speed of the bottom hold counter 13a fast in the traverse state.

Further, it generates the command CMD indicating that for example the selector 17 select the signal S3 so as to hold the count speed of the bottom hold counter 13a further faster in the high speed traverse state.

Next, the operation by the above circuit configuration will be explained.

An RF signal converted to a digital signal by a not illustrated A/D converter is held in the register 11 and output as the signal S11 to the peak hold counter 12 and the bottom hold counter 13a.

In the peak hold counter 12, a comparison of the value V12 held by the peak hold counter per se and the RF signal value S11 subjected to the A/D conversion is carried out at every sampling of the RF signal. When the RF signal value S11 is larger, that value is fetched. A down count is carried out at a certain speed, for example, at a frequency of 1.38 kHz, in a case other than this.

Also, at this time, a command CMD for adjusting the count speed of the bottom hold counter 13a is generated by the not illustrated microprocessor in accordance with the operation state and output to the command register 18. Then, this command CMD is decoded at the command decoder 19 and output as the selection indication signal S19 to the selector 17.

At the selector 17 receiving the selection indication signal S19, the signal S1 or S4 is selected so as to make the count speed of the bottom hold counter 13a slow during the normal play operation, a signal S2 is selected so as to make the count speed of the bottom hold counter 13a fast in the traverse state, and the signal S3 is selected so as to make the count speed of the bottom hold counter 13a further faster in a further higher speed traverse state. One of these is output as the enable signal S17 to the bottom hold counter 13a.

Accordingly, in the bottom hold counter 13a, a comparison of the value held by the bottom hold counter per se and the RF signal value S11 subjected to the A/D conversion is carried out at every sampling of the RF signal. When the RF signal value S11 is smaller, that value is fetched, while an up count is carried out at a speed indicated by the enable signal S17 in a case other than this.

Next, in the adder 14, the difference between the output signal (waveform) S12 of the peak hold counter 12 and the output signal (waveform) S13a of the bottom hold counter 13a is obtained and held in the differential register 15.

Then, in the comparator 16, the signal S15 of this difference and the threshold value Vth (not restricted to a fixed value) are compared. When the differential signal S15 is lower than the threshold value Vth, the MIRR signal is set to the high level H, and the MIRR signal is generated.

As explained above, according to the first embodiment, provision is made of the selector 17 which selects one signal among four count speed signals S1 to S4 of 1-fold (1F), 2-fold (2F), 4-fold (4F), and 0.5-fold (0.5F) the frequency F=5.6448 MHz set in accordance with the traverse speed or the set state in for example the microprocessor in accordance with the output signal S19 of the command decoder 19 which decodes the command CMD which changes the count up speed of the bottom hold counter 13a in accordance with the operation state set in the not illustrated microprocessor and outputs the same as an enable signal S17 to the enable terminal EN of the bottom hold counter 13a. Therefore, the bottom hold counter 13a can perform a count operation in accordance with the traverse speed or the set state and a stable MIRR signal can be generated in a wide band.

Note that, needless to say the number, frequency, etc. of the selection signal of the selector 17 are not restricted to those of the present embodiment.

SECOND EMBODIMENT

Figure 6:
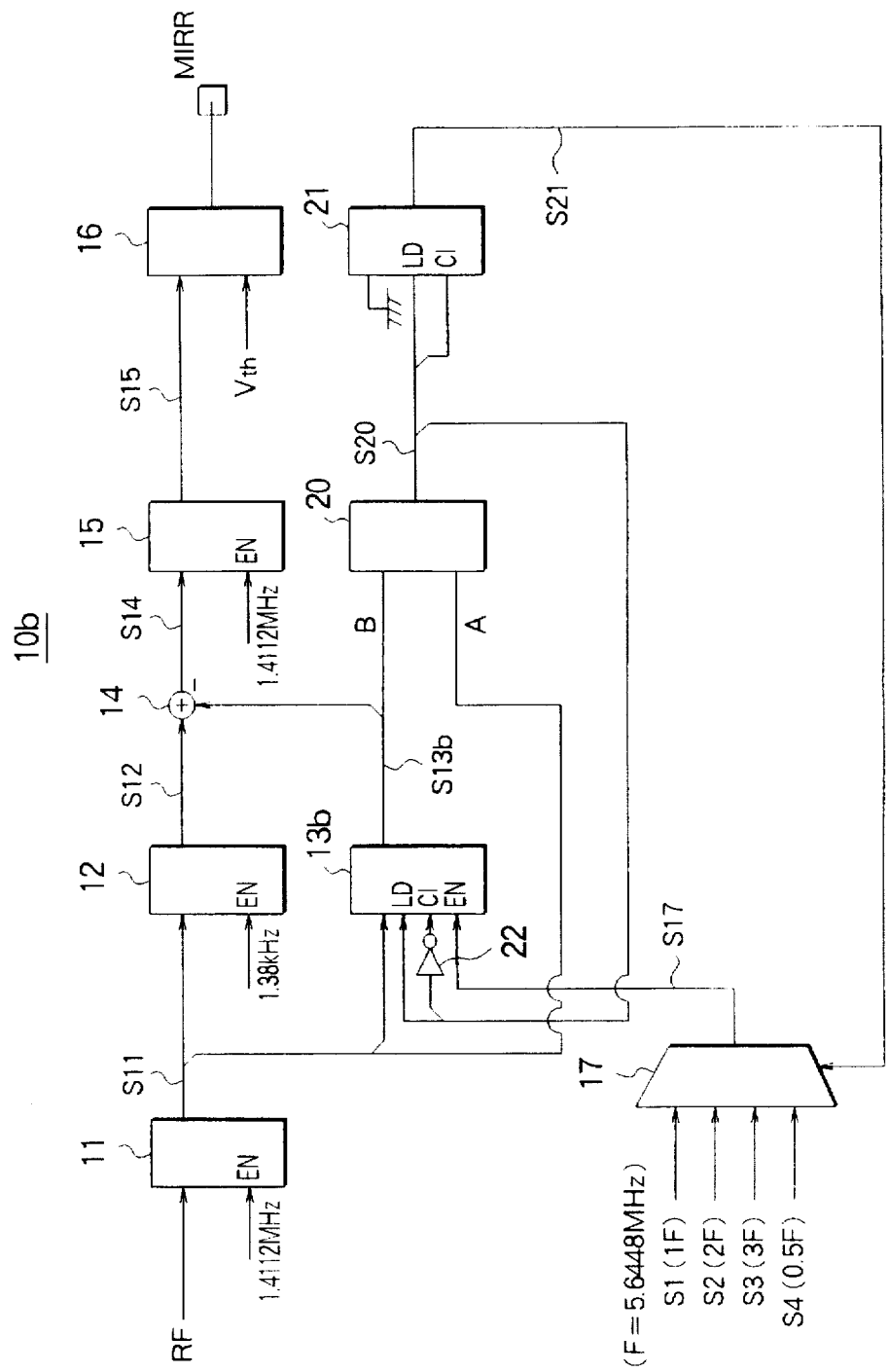
FIG. 6 is a block diagram of a second embodiment of the digital servo circuit of the optical disc player according to the present invention.

FIG. 6 is a block diagram of a second embodiment of the digital servo circuit of the optical disc player according to the present invention.

The second embodiment is constituted so that the count speed of the bottom hold counter 13a is not adjusted based on a command from the microprocessor* as in the first embodiment, but the speed is set inside the digital servo circuit 10b based on the rate of change of the value of the RF signal.

Specifically, a comparator 20 which compares the value A of the RF signal S11 and the value B of the output signal S13b of the bottom hold counter 13b, and a counter 21 which receives the output signal S20 of the comparator 20 and performs a load LD or count up operation are provided. The output signal S21 of the counter 21 is used as the selection indication signal of the selector 17.

Also, the output signal S20 of the comparator 20 is fed back to the carry-in terminal CI via the load terminal LD of the bottom hold counter 13b and the inverter 22.

Note that, the counter 21 performs a count up operation where the result of comparison of the comparator 20 is (RF signal value A)>(value B of the signal S13b) and performs a load operation, that is, a reset operation, of loading zero where (RF signal value A)≦(value B of the signal S13b).

Below, a further detailed explanation will be made of the fundamental operating principle of the circuit of FIG. 6.

The fundamental operation of the bottom hold counter 13b is similar to the case of the first embodiment. At every sampling of the RF signal, a comparison is made of the value held by the bottom hold counter 13b per se and the RF signal value subjected to the A/D conversion. That value is fetched when the RF signal value is smaller, while an up count is carried out at a certain speed in a case other than this.

In the second embodiment, in this way, attention is paid to the fact that the value of the RF signal and the value of the bottom hold counter 13b are compared at every sampling of the RF signal and, when the value of the RF signal is not fetched into the bottom hold counter 13b for a certain number of samplings, that is, if a state where the value A of the newly fetched RF signal is larger than the value B of the bottom hold counter 13b per se continues as a result of the comparison of the comparator 19, a signal S21 is generated at the counter 21 and output to the selector 17 so as to raise the speed of count up of the bottom hold counter 13b to for example twice.

By this, the signal S2 is selected in the selector 17.

If raising the count up speed enables the bottom hold counter 13b to catch up with the RF signal so that the value A of the newly fetched RF signal becomes smaller than the value B of the bottom hold counter 13b and is fetched into the bottom hold counter 13b, the signal S21 is generated in the counter 21 and output to the selector 17 so as to return the count up speed to the original speed.

By this, the signal S1 is selected at the selector 17.

FIGS. 7A to 7C are waveform diagrams showing an example of the operation of the respective signals with respect to the RF signal.

By repeatedly performing the above operation, a count up speed in accordance with the speed of rise of the bottom level of the RF signal can be given to the bottom hold counter 13b and a stable MIRR signal can be generated.

According to the second embodiment, it is not necessary to make the microprocessor judge the real traverse speed to set the speed, and there is an advantage that it is possible to cope with variations of the amplitude of the RF signal at the time of the traverse.

Also, the second embodiment is just one example of setting the speed inside a digital circuit based on the rate of change of the value of the RF signal and is not restricted to this.

Further, various variations are possible, for example, the system may be constituted so that the circuit of FIG. 5 and the circuit of FIG. 6 are combined and the user selects either function in accordance with the desired specifications.

What is claim is:

1. A digital servo circuit generating a digital RF signal in accordance with the intensity of a reflected light of light irradiated to a surface of a recording medium by an optical pickup and generating a mirror-surface detection signal based on a peak level and bottom level of the digital RF signal, said digital servo circuit comprising:

a peak level counter which performs a comparison between the potential of the digital RF signal and a first potential held in advance and, when the potential of the digital RF signal is larger than the first potential, holds the potential of the digital RF signal as the first potential and, when otherwise, performs a down count at a speed in accordance with an enable signal;

a bottom level counter which performs a comparison between the potential of the digital RF signal and a second potential held in advance and, when the potential of the digital RF signal is smaller than the second potential, holds the potential of the digital RF signal as the second potential and, when otherwise, performs an up count at a speed in accordance with an enable signal; and a count speed selection circuit which selects the speed of the count in accordance with the speed of movement of the irradiated spot of light irradiated to the surface of the recording medium and supplies the same as the enable signal to the bottom level counter.

2. A digital servo circuit as set forth in claim 1, wherein the count speed selection circuit selects one signal from among a plurality of count speed signals in accordance with an instruction of an external signal and that selected signal is used as the enable signal.

3. A digital servo circuit as set forth in claim 1, wherein the count speed selection circuit has a comparison circuit which compares the count value of the bottom level counter and the RF signal value and a selection circuit which selects one signal from among a plurality of count speed signals in accordance with the result of comparison of the comparison circuit and outputs the selected signal as the enable signal.

4. A digital servo circuit as set forth in claim 1, further comprising a differential signal generating circuit for generating a differential signal of said peak hold counter and said bottom hold counter and a waveform shaping means for shaping the waveform of said differential signal by a comparison with a reference voltage and the output of the waveform shaping means is used as the mirror-surface detection signal of the medium.

5. A digital servo circuit generating a digital RF signal in accordance with the intensity of a reflected light of light irradiated to a surface of a recording medium by an optical pickup and generating a mirror-surface detection signal based on a peak level and bottom level of the digital RF signal, said digital servo circuit comprising:

a peak level counter which performs a comparison between the potential of the digital RF signal and a first potential held in advance and, when the potential of the digital RF signal is larger than the first potential, holds the potential of the digital RF signal as the first potential and, when otherwise, performs a down count at a speed in accordance with an enable signal;

a bottom level counter which performs a comparison between the potential of the digital RF signal and a second potential held in advance and, when the potential of the digital RF signal is larger than the second potential, holds the potential of the digital RF signal as the second potential and, when otherwise, performs an up count at a speed in accordance with an enable signal; and a count speed selection circuit which selects the speed of the count in accordance with the speed of movement of the irradiated spot of light irradiated to the surface of the recording medium and supplies the same as the enable signal to the peak level counter.

6. A digital servo circuit as set forth in claim 5, wherein the count speed selection circuit selects one signal from among a plurality of count speed signals in accordance with an instruction of an external signal and that selected signal is used as the enable signal.

7. A digital servo circuit as set forth in claim 5, wherein the count speed selection circuit has a comparison circuit which compares the count value of the bottom level counter and the RF signal value and a selection circuit which selects one signal from among a plurality of count speed signals in accordance with the result of comparison of the comparison circuit and outputs the selected signal as the enable signal.

8. A digital servo circuit as set forth in claim 5, further comprising a differential signal generating circuit for generating a differential signal of said peak hold counter and said bottom hold counter and a waveform shaping means for shaping the waveform of said differential signal by a comparison with a reference voltage and the output of the waveform shaping means is used as the mirror-surface detection signal of the medium.

* * * * *